Feb. 9, 1943.   J. T. LOHMAN ET AL   2,310,586
MEANS FOR PREVENTING BACK FLOW IN PLUMBING SYSTEMS
Filed April 26, 1940   4 Sheets-Sheet 2

JOHN T. LOHMAN
ROWLAND L. LOHMAN
INVENTORS

BY
ATTORNEYS

Patented Feb. 9, 1943

2,310,586

UNITED STATES PATENT OFFICE 2,310,586

MEANS FOR PREVENTING BACKFLOW IN PLUMBING SYSTEMS

John T. Lohman, Los Angeles, and Rowland L. Lohman, North Hollywood, Calif., assignors to Lohman Bros., Los Angeles, Calif., a corporation of California Application April 26, 1940, Serial No. 331,800

2 Claims. (Cl. 137—78)

This invention relates to a means for preventing backflow in plumbing systems.

In the operation of plumbing systems in which water is delivered by water supply mains to a consumer service system it often occurs that a pressure differential will be created between the water in the supply mains and the water in the consumer service system. Also, this differential pressure often occurs upon the consumer's property between different parts or areas thereof or within devices or plumbing fixtures which may be included within the piping system upon the consumer's property, acting independently of pressure fluctuations originating or occurring solely within the water supply mains supplying the consumer's service lines. This may cause backflow or back syphonage. Plumbing systems in which such conditions exist may be the usual domestic water system in which it is essential that a potable water supply may be maintained. Pressure differential conditions may also occur when a boiler or other pressure creating apparatus is included in a water service system. In describing the present invention the term "backflow" means the flow of impure water into a pure water system. This flow may be caused by gravity, vacuum or other pressure differential creating conditions. "Back syphonage" is one form of backflow caused by the creation of a vacuum in the water supply lines. "A backflow connection" is an arrangement whereby backflow may occur and may refer to a "cross-connection," which is a plumbing arrangement in which the service lines are fed from two sources, one being the supply main and the other a separate source of water supply, such for example as a well from which water is pumped, or a cross-connection between different sections of the same piping arrangement. Under these various conditions a pressure differential between the supply line and the service line, whether created by a positive pressure in the service line or a negative pressure in the supply line, will cause the water in the supply mains to become contaminated and render it unsanitary and unpotable. It is the principal object of the present invention, therefore, to provide a means for controlling the flow of water within a supply main and a service main to automatically prevent a counter-flow of water from the service pipes to the supply main so that any backflow action will be interrupted by the interposition of a positive barrier and the creation of a broken connection under certain conditions or actions between the supply main and the service main during which time pressure differential will be readjusted to bring the two pressures into equilibrium while preventing the flow of water from the service pipes into the supply main, the structure acting automatically to reestablish flow of water from the supply main to the service main when a predetermined equalization of pressure again occurs in the system.

The present invention contemplates a means for preventing backflow from service pipes to a water supply main including an automatic positively operated differentiated pressure valve means for shutting off the backflow of water from the supply main, breaking the connection between the two mains and then readjusting the pressure when a pressure differential exists on either side of the line, or upon consumer's premises.

The invention is illustrated by way of example in the accompanying drawings in which.

Figures 1, 2:
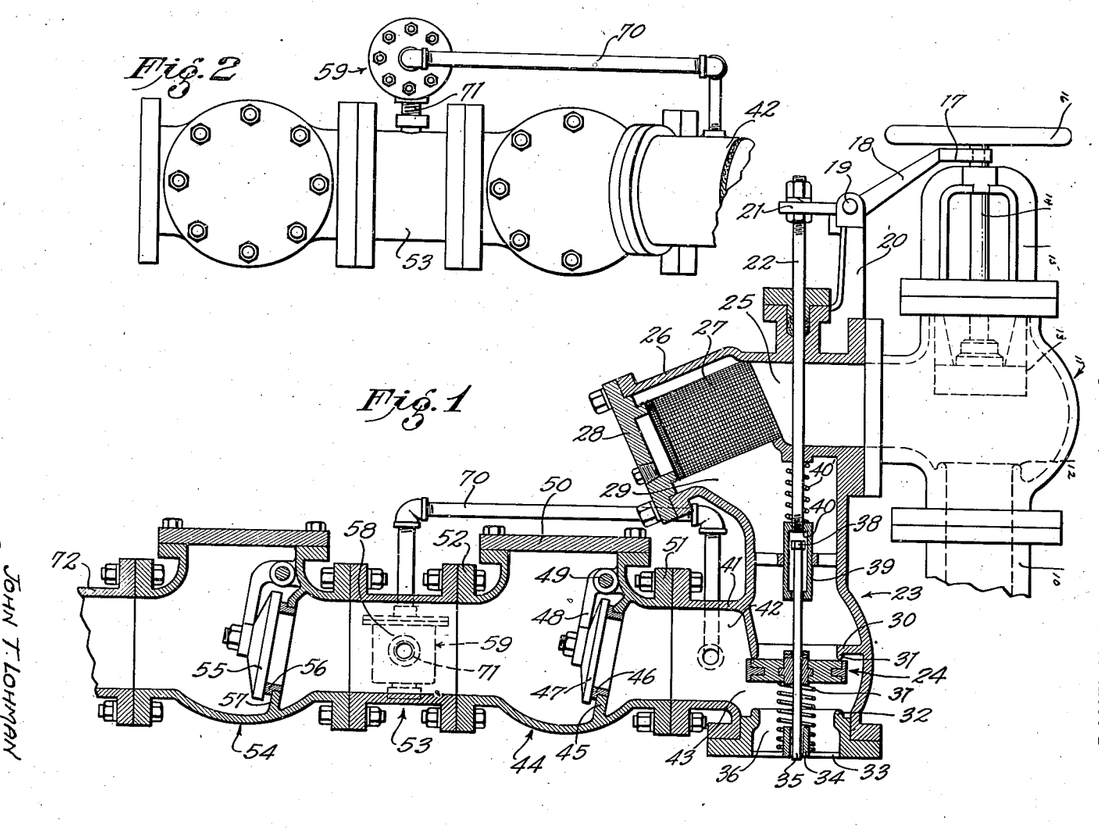
Figure 1 is a view in central vertical section showing the apparatus embodying the preferred form of the present invention with the parts in their normal position when the water in the system is in a static condition.
Fig. 2 is a fragmentary view in plan showing the form of the invention disclosed in Fig. 1.

Referring more particularly to Figs. 1 and 2 of the drawings, 10 indicates a water main which is in communication with a potable supply of water such as conducted by a water supply or the like. The pipe 10 is connected with a cut-off valve 11 which is fitted with the usual valve seat 12 and movable valve element 13. The valve element 13 is actuated by a valve stem 14 here shown as extending upwardly therefrom and supported in a frame structure 15. Mounted upon the upper end of the valve stem 14 is a hand wheel 16 by which the valve may be manually operated. Disposed beneath the hand wheel is the fork 17 of a lever 18. This lever is carried upon a pivot 19 supported by a bracket 20. A lever arm 21 is formed as a part of the lever and stands substantially horizontally. Extending downwardly through the lever arm 21 is a push rod 22. This rod extends into a housing 23 provided for the double disc valve 24. The upper end of this housing is fitted with a horizontally extending water leg 25 which communicates with the housing of the angle valve 11. The lateral extension of the valve housing 23 is indicated at 26 and is substantially cylindrical. This extension receives a cylindrical strainer basket 27 which is mounted upon a removable head 28 and will strain the water passing from the main 10 and through the valve 11. In communication with the strainer housing 26 is a downwardly extending passageway 29. The water may flow through this passageway into the main portion of the valve housing 23 and to a partition wall 30. The partition wall 30 is fitted with a valve seat 31 against which the double disc valve 24 seats in one of its positions. Spaced with relation to the valve seat 31 and therebeneath is a valve seat 32 against which the double disc valve element 24 seats in its other position. The valve seat 32 carries a spider 33 supporting a central bearing 34. The central bearing receives a valve stem 35 which extends upwardly within the dual valve housing 23 and upon which the dual valve disc 24 is fixed. A passageway 36 is formed through the valve seat 32 and the spider 33 to permit the free flow of atmospheric air into the structure when the disc valve 24 is elevated and through which water can be expelled to atmosphere. A coil spring 37 is interposed between the bearing 34 of the spider 33 and the disc valve 24 and acts normally to force the disc valve upwardly from its position on the seat 32 to register with the seat 31. The upper end of the dual valve stem 35 is fitted with a head 38. This head reciprocates within a sleeve 39 so that the stem may move freely except when positively acted upon by the stem 22 with which it is longitudinally aligned. The sleeve 39 is carried upon the lower end of the push rod 22. This rod moves downwardly when the valve stem 14 of the angle valve 11 moves upwardly. The length of the push rod 22 and the valve stem 35 are of such relation to each other as to insure that there will be lost motion between the end 40 of the sleeve 39 and the head 38 of the valve stem 35. By this arrangement the spring 37 will yieldably act against the valve so that the water pressure will tend to urge the disc valve 24 from its upper position. Downward pressure of the incoming water will move the valve element 24 from its seated position on the valve seat 31 and against the valve seat 32. A tubular lateral extension 41 is formed as a part of the valve housing 23 and provides a chamber 42 which may be alternately placed in communication with the supply of water from the main 10 or with the atmosphere through the valve seat 32 and its spider 33. The chamber 42 is formed with a passageway 43 between the valve seats 31 and 33. Fitted at the end of the chamber 42 is a check valve housing 44. This housing extends horizontally and is formed with a transverse partition wall 45 having a valve seat 46 therethrough. A gravity operated valve element 47 may swing to a seated position against the seat. This element is mounted upon an arm 48 pivoted above the seat upon a pivot 49. The pivot 49 is carried within the housing 44 and is disposed horizontally. A cover plate 50 is secured over the top of the housing 44 and when it is removed will permit access to the valve 47. The opposite ends of the check valve housing 44 are fitted with bolting flanges 51 and 52, the flange 51 securing the structure to the dual valve housing 23. The bolting flange 52 secures the check valve housing 44 to a tubular coupling 53 which in turn is secured to the housing 54 of a second check valve 55. The check valve 55 is used as an additional precautionary means of entrapping the water in the service line side of the system so that when the direction of flow of water in the system is counter to its normal direction of flow the valve 55 will close.

By reference to Fig. 1 it will be seen that when the check valves 47 and 55 are in their seated positions a chamber will occur between them as housed by the valve housings 23 and 54 and the intermediate tubular coupling 53. This chamber is indicated at 58 and when sealed by the closing of the two check valves provides a particular function in the present apparatus. In communication with the chamber 58 and preferably directly attached to the coupling 53 is a unit 59. This unit is an automatically set relief valve which operates on a differential pressure existing between the chambers 42 and 58. The structure is particularly shown in Fig. 3 of the drawings, where it will be seen to comprise an outer housing 60 having a valve seat 61 in its bottom wall and through which communication is established with a relief pipe 62. A gravity operated check valve 63 may rest on this seat and will act to close the seat 61 normally and interrupt communication with the pipe 62. A valve stem 64 is formed as a part of the valve 63 and extends upwardly therefrom. This valve stem reciprocates within a bearing 65 carried by the cover plate 66 of the valve housing 60. Carried by the cover plate 66 is a Sylphon bellows 67. This bellows is secured to the plate and is sealed along the marginal edge thereof. Extending upwardly through the Sylphon bellows is the valve stem 64 which is fitted with a collar 68 pinned onto the valve stem and bearing against the under closed face of the bellows. The valve stem bearing 65 projects downwardly into the interior of the bellows and at the center of the cover plate 66, and within the end wall of the bearing is a passageway 69 which communicates with a bypass pipe 70. The bypass pipe 70 leads to the chamber 42 which occurs between the dual valve 24 and the first check valve 47. The valve housing 60 is provided with a lateral pipe 71 which communicates with the coupling 53. It will thus be seen that the pressure prevailing within the housing 60 and on the outsde of the Sylphon bellows 67 is the pressure occurring within the chamber 58, and that the pressure prevailing within the bellows and the pipe 70 is the pressure within the chamber 42. When these two pressures are equal as established by the water pressure in the main 10 the valve 63 is on its seat. When, however, the pressure within the house service line 72 is greater than the counter pressure of the water in the main 10, the pressure upon opposite sides of the Sylphon bellows 67 will be unbalanced to lift the valve 63 and to relieve this pressure to bring it into balance with the supply main 10, after which the Sylphon bellows and the valve 63 will be actuated when the water main pressure and the service pipe pressure are again substantially equal. It will thus be seen that the valve 63 will be automatically set by the water main pressure and that a backflow or pressure differential action in the service pipes will alter this condition and lift the valve 63 from its seat to establish communication with the atmosphere.

Figures 3, 4:
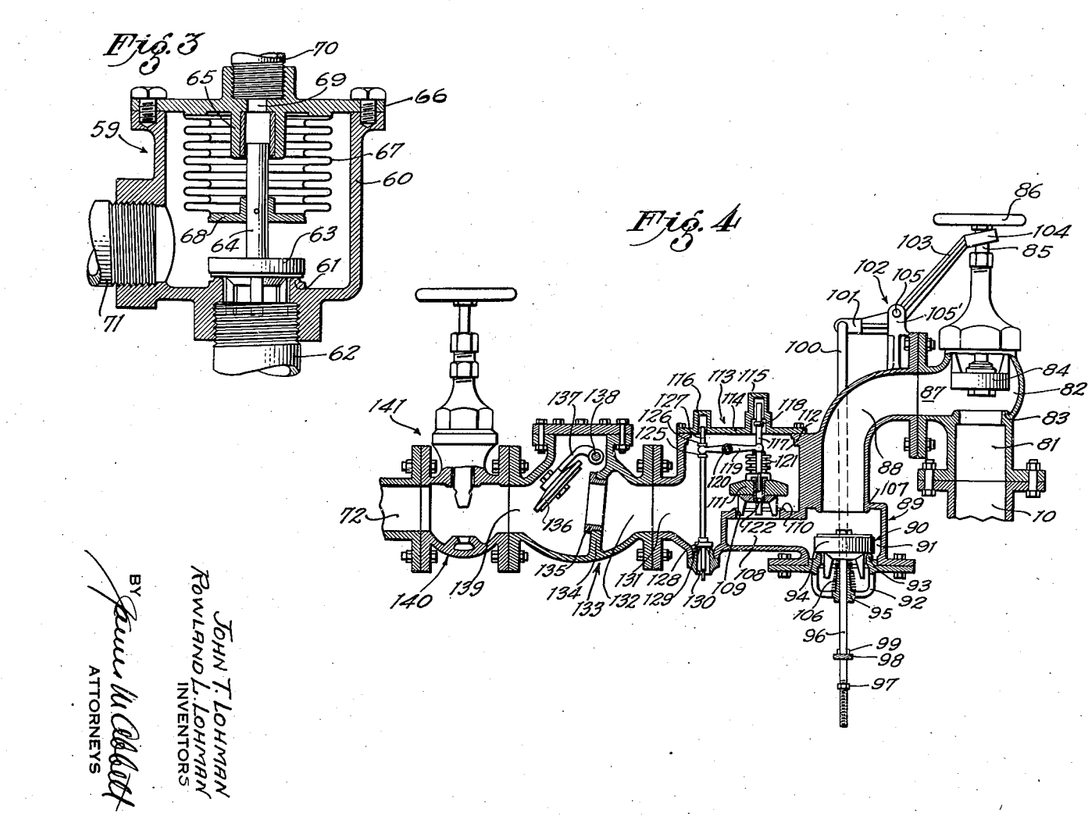
Fig. 3 is an enlarged view in central vertical section showing the automatic relief valve used in the form of the invention disclosed in Figs. 1 and 2.
Fig. 4 is a view in central vertical section showing another form of the invention with the valve elements operatively disposed in the positions assumed by them when the flow through them is normal.
Figure 5:
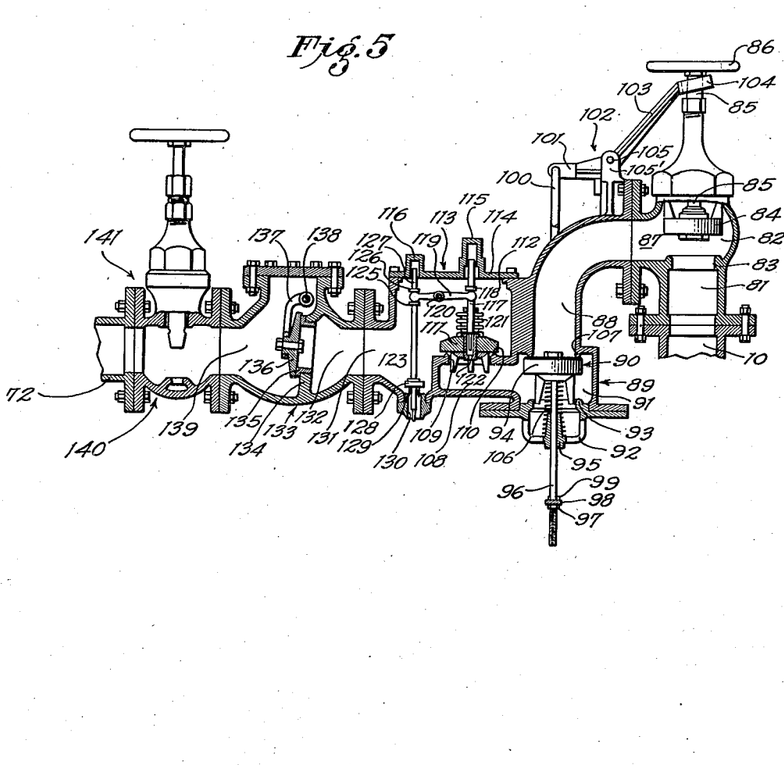
Fig. 5 is a view in central vertical section similar to Fig. 4 showing the valve elements closed as will be the case under conditions of back-syphonage.

Referring more particularly to Figs. 4 and 5 of the drawings another form of the invention is shown. In this structure 10 indicates a water main which is connected to the inlet leg 81 of an angle valve 82. The angle valve 82 is provided with a valve seat 83 at the top of the leg 81 and with a valve element 84 adapted to be moved manually toward and away from said seat by a valve stem 85 and an operating handle 86. An outlet leg 87 is formed as a part of the housing of the angle valve 82 and is here shown as disposed at right angles thereto. A water leg 88 is connected to the member 87 and extends outwardly and downwardly therefrom. This water leg is part of an automatic valve housing 89 enclosing the automatic dual valve structure generally indicated at 90. The valve housing 89 is formed at the lower end of the leg 88 with a valve chamber 91. At the bottom of the valve chamber 91 is a bolting flange which receives a valve cage 92. The valve cage 92 carries a valve seat 93 at its upper end to receive a vertically moving valve element 94. The cage 92 is open to the atmosphere beneath the valve seat for purposes to be hereinafter described. A bearing 95 forms a part of the cage 92 and receives the stem 96 of the valve 94. The lower end of the stem is threaded and carries a nut 97 which rests upon a cross-head bar 98. The cross-head bar 98 is supported by adjusting nuts 99 carried by link rods 100. The link rods 100 are pivotally secured at their upper ends to a horizontal leg 101 of a bell crank 102. A leg 103 of the bell crank extends upwardly and is forked at its upper end as indicated at 104 to embrace the valve stem 85 of the valve 84 and to be depressed when the hand wheel 86 is moved downwardly. The bell crank 102 is mounted upon a pivot pin 105 carried by a lug 105' on the housing 89. Thus, when the manually operated valve 84 is moved toward its position on seat 83 positive action will take place to move the valve element 94 upwardly and toward valve seat 107. This action will break the seal between the valve element and its seat and will permit the spring to urge the valve upwardly against the upper seat. Interposed between the cage 92 and the valve 94 is a helical spring 106 which yieldingly resists downward movement of the valve 94 and tends to urge the valve element 94 from its seat 93. Opposed to the lower seat 93 is the upper valve seat 107 formed within the housing and at the lower end of the water leg 88. It will be evident that when the valve moves upwardly to engage the upper seat 107 the valve will prevent a flow of water and air into the water leg in a counter direction to that of the normal supply stream.

Extending laterally from the valve chamber 91 in the housing 89 is a drain chamber 108. This chamber communicates directly with the valve chamber 91 and is formed with a port 109 in its upper wall circumscribed by a valve seat 110. A check valve 111 is designed to move vertically and in its closed position rests upon the seat 110. This valve is disposed within an upper valve chamber 112 carried within a housing 113 which is attached to the side of the valve housing 89 and the water leg 88. A cover plate 114 is mounted removably at the top of the check valve chamber 112 and is formed with guide bearings 115 and 116. The guide bearing 115 receives a reciprocating valve stem 117, at the lower end of which the check valve 111 is mounted. The stem 117 is formed with a collar 118 beneath which the forked end of a rocker arm 119 is positioned. This rocker arm is mounted within the valve chamber 112 upon a pivot pin 120. The stem 117 extends downwardly into the check valve element 111 and through a Sylphon bellows 121. This bellows is secured to the valve stem 117 at its upper end, which end is closed. The lower end of the bellows is secured over the valve element 111 while the valve element is formed with a central passageway 122 therethrough to permit free access of fluid into and out of the bellows. The purpose of the bellows is to insure that backflow and pressure differential within the system will act in a forceful and positive manner to set the valve element 111 upon the valve seat 110 when a condition of back-syphonage or backflow occurs, and will thereafter allow sufficient latitude of movement of the valve stem 117 so as to positively move the rocker arm 119. After the valve is seated the free end of the rocker arm 119 fits between collars 125 and 126 on the stem 127 of a bleeder valve 128. This valve cooperates with a seat 129 in the bottom of the housing enclosing the chamber 112. The seat 129 is formed with a port 130 through it by which communication is established from the chamber 112 to the atmosphere. A fluid passageway 131 leads from the housing of the valve chamber 113 into the throat 132 of a check valve housing 133. The check valve housing is divided transversely by a partition wall 134 carrying a valve seat 135 against which a valve member 136 rests. The valve member 136 is mounted upon a swinging arm 137 carried by a pivot 138. Upon the opposite side of the partition 134 from the passageway 132 is a fluid passageway 139 which communicates with the housing 140 of a gate valve structure 141. The gate valve controls the flow of water to the service line 72 which leads to the service distribution system. It will thus be seen that the valve structure of Figs. 4 and 5 including the various units described is assembled and interposed between the water main 10 and the service pipe 72.

One of the essential elements of the present invention is the automatically set relief valve. In the form of the invention shown in Figs. 1, 2 and 3 this is the valve structure including the valve element 63 which is actuated by unbalanced pressure conditions in the line. In the form of the invention shown in Figs. 4 and 5 this valve element includes the valve 111. It will be understood that various changes can be made in the construction and arrangement of the parts of the relief valve and other forms of the invention are therefore shown in Figs. 6 and 7.

Figure 6:
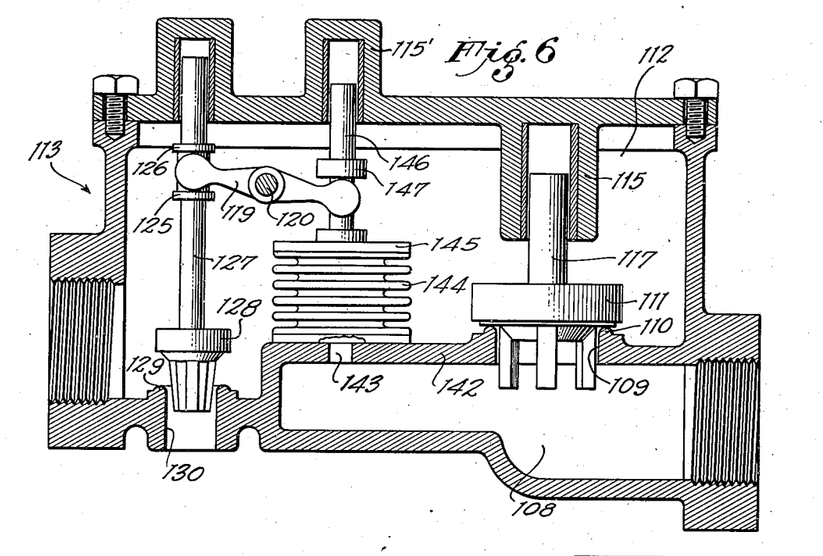
Fig. 6 is an enlarged view in vertical section showing the automatic valve element used in the form of the invention shown in Figs. 4 and 5.

Referring to Fig. 6, the valve element 111 is indicated as being mounted separately from the pressure responsive means. In this particular structure the valve housing 113 includes a chamber 112 and the chamber 108. The valve seat 110 receives the valve element 111, the stem 117 of which is mounted in a separate bearing 115 so that the valve element 111 is free to fall by gravity and be elevated by fluid pressure. The valve opening 109 for the valve 111 is formed through a partition wall 142 of the valve housing 113.

In the form of the invention shown in Fig. 6 a port 143 is provided and establishes communication between the chamber 108 and the chamber 112. Mounted over the port 143 within the chamber 112 is a Sylphon bellows 144 which is sealed to the partition 142 and is fitted at its upper end with an end plate 145. This end plate carries a stem 146 slidably mounted in a bearing 115'. A collar 147 is carried by this stem in spaced relation to the end plate 145 and is disposed above a rocker arm 119, as previously described. This rocker arm is carried on the pivot 120 and its free end is positioned between collars 125 and 126 upon valve stem 127. This stem, as previously described, carries the bleeder valve 128 designed to seat upon the valve seat 129 disposed around the port 130. In this form of the invention a superior fluid pressure in the chamber 112 will act simultaneously but separately to close the valve 111, to compress the bellows 144 and to lift the bleeder valve 128.

Figure 7:
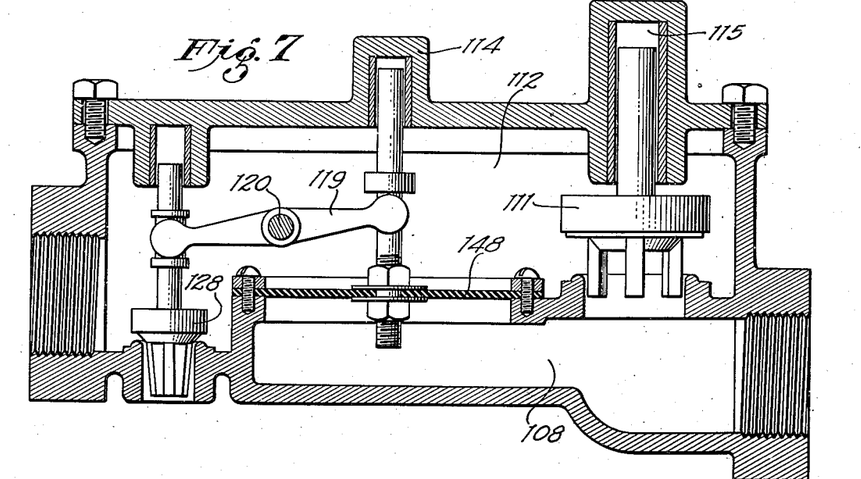
Fig. 7 is a view in central vertical section showing another form of the invention wherein a flexible diaphragm is used in the place of the Sylphon bellows.

In the form of the invention shown in Fig. 7 of the drawings the structure and operation is the same as that of the structure in Fig. 6 with the exception that a flexible diaphragm 148 carries the stem 146 and actuates the rocker arm 119.

In the operation of the form of the invention shown in Figs. 1 to 3, inclusive, of the drawings, it is to be understood that water under suitable pressure is delivered through the water main 10 for a service distribution system through the service pipe 72. As previously explained, under certain conditions the pressure of the supply of water in the main 10 may become less than the pressure of the water existing in the service pipe 72 and the distribution pipes connected therewith. When such a condition exists backflow, back-syphonage and differential pressure will occur from the service pipes to the water main 10 and the structures here disclosed are provided to prevent such an action.

It is to be understood that when the system including the supply main and the service main is empty, and when it is filled with water under the prevailing supply main pressure and the water is static, the check valves 47 and 55 in the apparatus will be closed. When, however, the angle valve 11 is open to fill the empty system or when any of the outlets in the service line are open to withdraw water therefrom there will be a flow of water through the system which will open the check valves temporarily. These valves will then close when the water again becomes static or when a counterflow condition is created.

Under normal conditions the angle valve 13 is raised from its seat 12 so that water may flow into the valve housing through the water main 10. It will continue through the passageway 25 and the strainer 27 into the vertical water leg formed within the dual valve housing 23. When the valve 13 is opened the lever 18 will swing downwardly under the influence of the spring 40' and will act upon the push rod 22 to permit the dual valve 24 to move downwardly and away from its seat 31. The water pressure will compress the spring 37 under the dual valve 24 and force that valve onto its seat 32 and hold it upon its seat. When the valve 24 is thus held on its seat 32 the valve housing 23 will be sealed against entry of the air from the atmosphere and will permit the water flowing from the main 10 to flow through passageway 43 into the chamber 42. It will then encounter the gravity actuated check valve 47 which will be lifted from its seat to the dotted line position in Fig. 1. At this same time the incoming water from the main 10, under the pressure within the main, will be diverted through pipe 70 to the automatic relief valve unit 59. Here the fluid pressure exerted by the water in the pipe 70 will fill the bellows 67 and force the check valve 63 down onto its seat 61 and seal the valve housing 60 from entry of air through the pipe 62. The water will also flow through the chamber 58, lifting the gravity operated check valve 55, so that the flow from the water supply main can then be established through the service pipe 72. In the event that the pressure in the service pipe for any reason becomes in excess of the pressure in the water main, or stating the problem inversely, in the event that the pressure in the water main becomes less than the pressure in the service pipe the valve structure will instantly act automatically in an operation to reestablish equilibrium between the water main pressure and the service pipe pressure. Under either of these conditions a backflow, back-syphonage or pressure differential action occurs immediately and the superior pressure within the service line 72 will act to overcome the lesser pressure within the water main 10. In view of the fact that under normal conditions when the pressure is static the water pressure is equal throughout the apparatus, thus at this time the valves 47 and 55 will be in their closed positions. The valve 24 will be moved to its lowermost position seated against the seat 32 and the valve 63 will be held on its seat. It is also to be pointed out that at this time there will be equal pressure in the chamber 42 and the chamber 58 due to the fact that the chamber 58 is connected to the equalizer valve housing 60 and that the pipe 70 insures an equal pressure within the bellows 67 and the chamber 42. It will also be recognized that this uniform pressure will be exerted throughout the system when a demand is made on the service line 72 for water, since at that time water will flow through the valve housings and while flowing will open and maintain the check valves 47 and 55 in an opened position. When a superior pressure occurs within the service line 72 an emergency will be created which requires the readjustment of the apparatus to prevent any form of backflow from the service line 72 to the supply line 10. If the backflow condition occurs when either the water is static or a reduced pressure below normal pressure maintains in the service line 10 it will be evident that the check valves 47 and 55 will remain closed and will tend to set against their seats since the superior pressure is on the service side of the line. At such a time the dual valve 24 will remain on its seat 32 until the water pressure reaches a pressure of the order of atmospheric pressure, at which time the atmospheric pressure plus the pressure of the spring 37 will urge the valve 24 from its seat 32 and against the seat 31. Prior, however, to the time when the pressure in the service main has become lowered to a pressure of the order of atmospheric pressure it will be evident that the fluid entrapped between the check valves 47 and 55 and within the chamber 58 will be substantially that at which the water supply was originally maintained. There will be, however, a reduced pressure of the incoming water from the supply main to the chamber 42. This will reduce the pressure in the sylphon bellows 67 of the relief valve so that the pressure within the chamber 58 and the housing 60 of the relief valve will be greater than the reduced pressure of the supply main. The result will be that the valve 63 will be lifted from its seat to evacuate the chamber 58 and to lower the pressure in this chamber to the pressure established by the incoming water supply in chamber 52. It will also be evident that the lifting of the valve 63 will permit seepage from around the valve 55 to escape without polluting the water in the supply main. The valve 63 will remain opened and will be the only opening in the system to atmosphere until the pressure of the water in the supply main 10 lowers to the order of atmospheric pressure, at which time the dual valve 24 will be lifted from its seat to interrupt the further inflow of water from the supply main and the chamber 42 will be placed in communication with atmosphere through the passage 36 in the valve seat 32. This condition will prevail until water pressure in the supply main increases to a pressure above atmospheric pressure plus the strength of the spring 37 when the valve 24 will move to its seat 32.

When the fluid pressure within the water supply main 10 and the service pipe 72 become equalized the entire valve structure will readjust itself. The pressure of the incoming stream of water from the water main 10 will force the dual valve 24 downwardly against the compression of the spring 37 and onto the seat 32. The water will then flow through the passageway 43 into the chamber 42 and also through the pipe 70. The water within the chamber 42 will open the valve 47 by lifting it from its seat 46. At the same time the water will exert a pressure through the pipe 70 to the interior of the bellows 67 and will force the valves 63 down onto its seat against atmospheric pressure. This will be accompanied by a seating action of valve 63 by direct pressure as the water flows through valve 47 and into chamber 58. The water flowing through the valve housing 44 and the coupling 43 will then strike the valve element 55 and lift that element from the seat 56, after which the supply of water will flow onwardly to the service pipe 72 as the flow pressure is equal.

In the form of the invention shown in Figs. 4 and 5 of the drawings it will be seen that the structure is indicated as being in its full opened position in Fig. 4 and in its closed position in Fig. 5. In its opened position water from the supply main 10 will pass upwardly through the supply line 81 and the valve seat 83 to the chamber 82 of the angle valve housing and beneath the valve 84. It will then flow along the passageway 87 to the vertical water leg 88 where it will encounter the dual valve 90 and will force this valve downwardly against the expansive action of spring 106. The water will then flow through chamber 108 to the port 109, where it will exert an upward pressure against the valve element 111 to elevate the same. Upward movement of this valve will also lift the Sylphon bellows 121 carried thereupon. The rocker lever 119 is free to fall and permit the valve stem 127 to move downwardly so that the valve 128 will seat upon the seat 129. The pressure of the supply water will hold the valve 128 to its seat. This will exclude communication to the air through the port 130. The check valve 137 will then be lifted as the water flows, and since the valve 141 is open water will flow through the service pipe 72.

Assuming now that the water in the system is static or that a backflow surge occurs, the bellows valve 111 will be on its seat and the check valve 136 will also be on its seat. It is to be understood that the check valve 136 is not absolutely essential. It, however, does act to entrap the water which is in the service lines and to prevent it from having a sufficient backflow to exert a back-syphonage action in the service lines. Slight leakage may occur around the valve 136 but if this does take place this leaking fluid will drain from the system through the valve seat opening 130 in a manner to be hereinafter described. At such a time the pressure prevailing in the chamber 112 will be the pressure prevailing in the system, and in the event of a drop in pressure on the supply main side the superior pressure will be within the chamber 112 as distinguished from the chamber 108. This pressure will then force the valve 111 tightly onto its seat and will insure that a complete shut-off will occur at the valve 111. In the event that the valve 136 is not present in the structure or that it does not seal properly it will be evident that the force of the entire pressure head in the service side of the line will be exerted upon the valve 111 to initially seat it, and that the pressure prevailing within the chamber 112 will subsequently act to compress the bellows 121. As this bellows is compressed due to the existence of differential pressures in the chamber 112 and the chamber 108 the valve stem 117 will be drawn downwardly until the collar 118 engages the lever 119 and continues to move downwardly as the valve stem 127 is lifted to lift the valve element 128 from its seat 129. This action will cause the chamber 112 and the chamber 131 to be evacuated and will also provide for the bleeding off of any leakage from around valve 136. It will be recognized that if valve 136 is not present in the structure and the equilibrium of pressure is not promptly restored the entire column of water standing in the service lines would be drained eventually from those lines. This is not desirable, and therefore, the valve 136 serves the purpose of completely or substantially entrapping the water which is in the service lines.

During the period of operation previously described the dual valve 90 will remain in its seated position upon the seat 93 so that the pressure within the chamber 108 will be the pressure in the supply main. When, however, the pressure in the supply main reaches a pressure of the order of atmospheric pressure, and which pressure would be specifically atmospheric pressure plus the force of the spring 106, the dual valve will then move upwardly onto its seat 107 and prevent the flow of water from the water leg 88. At the same time it will be evident that the valve cage 92 will be opened so that any water which has accumulated within the chamber 108 will be instantly discharged. It will be recognized that in the event the check valve 136 has fully seated or that it does not leak to a greater extent than could be readily drained off through the valve seat 129 the chamber 112 and the chamber 108 will be under atmospheric pressure, and that there will be a positive and direct break between the supply main and the service main. This will insure that even though both the valve 111 and the valve 136 fail so that the service lines drain completely they would drain to atmosphere and not into the supply line, and that furthermore, the pressure of the water draining from the service lines will act against the under face of the valve element 94 to hold it to its seat in opposition to the pressure in the supply main. When the pressure in the supply main builds up again to a pressure in excess of atmospheric pressure plus the strength of the valve spring 106 the valve element 94 will move downwardly from its seat 107 and will be forced onto the seat 93 where it will be held by the pressure of the inflowing stream of water from the supply main. This water will fill the previously evacuated chamber 108 and will lift the valve 111 from its seat 110. This will simultaneously lift the bellows 121 mounted upon the valve 111 and will relieve the lever 119 from engagement with the collar 118 on the valve stem 117. As the chamber 112 then fills with water the valve stem 127 and the valve 128 are free to drop, and the water pressure will act upon the top of the valve 128 to force it onto its seat 129. As the chambers 112 and 131 fill the supply will be restored to the service main 72 and if the valve 136 had entrapped water within the service main at the pressure at which the system failed an equilibrium of pressure will be re-established within the chamber 112 and the service main pipe 72. In the event that the supply main pressure is in excess of atmospheric pressure but not equal to the pressure in the service line the restoration of equalized pressure will not be effected and cannot take place. When, however, equalization of pressure in the service line and the supply line have been re-established the structure will be readjusted without any incidental backflow in the lines by re-arranging the valves, as shown in Fig. 4 of the drawings, and eliminating the break in the line which had occurred during abnormal conditions.

It will thus be evident that regardless of whether or not the pressure differential existing between the water main 10 and the service pipe 72 was created by positive pressure in the service pipes counter to the pressure in the water main or whether it was produced by a negative pressure in the water main creating a suction action in the service pipe the entire structure will act automatically to prevent back-syphonage, and backflow.

Attention is directed to the fact that in either form of the invention, as disclosed in Figs. 1 and 2 or Figs. 4 and 5, valve control ports leading to the atmosphere are disposed below the level of the valve 24, as shown in Fig. 1, or valves 94 or 111, as shown in Figs. 4 and 5. By this arrangement there cannot be any possibility of seepage from the service pipe 72 to the water main 10. In the event that it is desired to shut off the supply of water being delivered through the water main 10 the angle valve 13 may be closed against its seat 12 in the form of the invention shown in Fig. 1, or the valve 84 may be forced onto its seat 83 in the form of the invention shown in Figs. 4 and 5. In the first of these instances the rod 22 will be lifted to allow the spring 37 to force the dual valve 24 onto its seat. In the other structure the rod 100 is lifted to allow the spring 106 to force the dual valve 94 onto its upper seat. By this arrangement the angle valves operate in unison with the dual valves to make a double shut-off of the water supply. Furthermore, it is to be pointed out that at such times the valve system is opened to atmosphere on the service pipe side of the main valve so that any contaminating liquid will drain from the structure.

As previously described, the structure of Fig. 6 is to take the place of the valve structure 111 shown in Figs. 4 and 5 of the drawings, the difference being that unbalanced fluid conditions will permit the valve 111 to move onto its seat when the superior pressure is upon the valve, and will at the same time exert a pressure on the bellows 144 to force it downwardly so that the valve 128 will be elevated from its seat.

An important feature of the present invention is that due to the bellows construction for actuating the bleeder valve in both types of the device, it is certain that the pressure which acts to collapse the bellows and to cause the valve 63 or the valve 128 to be lifted from its seat will first act to tightly hold the valve 47 or the valve 111 in their seated positions. This insures that the valves 47 or 111 will be definitely closed before any pressure is released by the valves 63 or 128 with the result that no seepage from the service lines can take place under backflow conditions.

The construction and operation of the valve structure shown in Fig. 7 of the drawings is substantially the same as that indicated in Fig. 6 with the exception that liquid pressure on the service side, which is greater than that in the water main, will flex the diaphragm 148 to elevate the valve member 128.

It will thus be seen that the structure shown in Figs. 1, 2 and 3 of the drawings, the structure shown in Figs. 4 and 5 of the drawings, or the variations shown in Figs. 6 and 7 will act to permit a free flow of water from the main to a service line while the fluid pressure is constant and uniform and at the pressure established in the water main, while any pressure differential in which the service pressure is superior to the water main pressure will operate automatically to relieve the service line pressure to the atmosphere and cut off communication between the water main and the service line, until such a time as the service line pressure is equal to or less than the water main pressure when communication with the atmosphere will be interrupted and a free flow of water from the supply main to the service main will be reestablished.

It is to be understood that while this invention has been disclosed as applied between a street water main and the inlet service main upon consumer property that the invention is equally applicable for use at any point in a line where there is possibility of objectionable backflow occurring and contaminating a liquid supply.

While we have shown the preferred form of our invention and the method of practicing the same, it is to be understood that various changes may be made in the steps of the method and the combination and arrangement of parts of the apparatus by those skilled in the art without departing from the spirit of the invention as claimed.

Having thus described our invention, what we claim and desire to secure by Letters Patent is:

1. In combination with a fluid supply main and a service main, an automatic valve structure having a conduit disposed in the line of flow from one main to the other, including a check valve in said conduit and a bleeder valve in connection therewith on the service side of the check valve, separate seats for said valves, the check valve being maintained open during normal pressure conditions with the superior force on the supply main side of the line and being closed when the pressure on the service main side of the line becomes equal to the pressure on the supply main side of the line, and fluid responsive means in connection with the conduit on both sides of the check valve and acting after said check valve is closed to open the bleeder valve.

2. In combination with a flow line including a fluid supply main and fluid service main, a valve structure interposed therebetween including an intermediate conduit through which fluid flow is established from one of said mains to the other, a partition in said conduit having an opening therethrough providing a valve seat, a normally seated partition valve element disposed on the service main side of the flow line to rest upon said valve seat and whereby under conditions of flow through the line the pressure of the fluid passing from the supply main to the service main will maintain the partition valve moved from its seat, a bleeder valve structure including a housing in communication with the service line and the atmosphere, a normally closed valve within said housing interrupting said communication with the atmosphere, a fluid responsive means within said housing and operatively attached to the normally closed valve, a tube connected to the supply main in advance of the partition valve and associated with the fluid responsive means to deliver fluid pressure to said fluid responsive means, the fluid responsive means being constructed so that pressure of fluid in the housing from said service line will act thereon in opposition to the pressure from the supply line, the entire arrangement being such that when the fluid exerting pressure from the service main is greater than the fluid exerting pressure from the supply main the bleeder valve will be maintained opened.

JOHN T. LOHMAN.
ROWLAND L. LOHMAN.